United States Patent
Kim et al.

(10) Patent No.: US 11,697,596 B2
(45) Date of Patent: Jul. 11, 2023

(54) METHOD AND APPARATUS FOR MANUFACTURING AEROGEL SHEET

(71) Applicant: LG CHEM, LTD., Seoul (KR)

(72) Inventors: Ye Hon Kim, Daejeon (KR); Je Kyun Lee, Daejeon (KR); Kyoung Shil Oh, Daejeon (KR)

(73) Assignee: LG Chem, Ltd., Seoul (KR)

(*) Notice: Subject to any disclaimer, the term of this patent is extended or adjusted under 35 U.S.C. 154(b) by 0 days.

(21) Appl. No.: 17/064,148

(22) Filed: Oct. 6, 2020

(65) Prior Publication Data

US 2021/0147243 A1  May 20, 2021

Related U.S. Application Data (62) Division of application No. 15/565,017, filed as application No. PCT/KR2017/000576 on Jan. 17, 2017, now Pat. No. 10,850,987.

(30) Foreign Application Priority Data

Jan. 19, 2016 (KR) .................. 10-2016-0006337

(51) Int. Cl.
*C01B 33/141* (2006.01)
*C01B 33/152* (2006.01)
(Continued)

(52) U.S. Cl.
CPC .......... *C01B 33/152* (2013.01); *B29B 15/122* (2013.01); *B29C 39/00* (2013.01);
(Continued)

(58) Field of Classification Search
CPC ... C01B 33/152; B29B 15/122; C08J 2205/02
See application file for complete search history.

(56) References Cited

U.S. PATENT DOCUMENTS

| 4,204,907 A | 5/1980 | Greany et al. |
| 5,789,075 A | 8/1998 | Frank et al. |

(Continued)

FOREIGN PATENT DOCUMENTS

| CN | 1833024 A | 9/2006 |
| CN | 1839024 A | 9/2006 |

(Continued)

OTHER PUBLICATIONS

XP002778526, Hirai, Yoshiaki et al., Water-absorbing sheets and their manufacture, Chemical Abstracts Service, Columbus, Ohio, US; retrieved from STN, Database accession No. 124:148397; pp. 1-2. Corresponding JP H-07-316337, published Dec. 5, 1995.

(Continued)

*Primary Examiner* — Seyed Masoud Malekzadeh
*Assistant Examiner* — Farah Taufiq
(74) *Attorney, Agent, or Firm* — Dentons US LLP (57) ABSTRACT

An apparatus for manufacturing an aerogel sheet including: a supply roller around which a blanket is wound to form a roll; a conveyor belt transferring the blanket wound around the supply roller from one side to the other side thereof; a silica sol supply member injecting the silica sol to a surface of the blanket disposed on the conveyor belt to impregnate the blanket with silica sol; a catalyst supply member injecting a gelling catalyst to the surface of the blanket impregnated with silica sol to gelate the silica sol; a collection roller winding the blanket, which is transferred up to the other side by the conveyor belt, in the form of a roll; and a reaction vessel which accommodates the roll-shaped blanket collected by the collection roller and in which the accommodated blanket is aged, modified by injecting a coating solution, or dried at a high temperature.

1 Claim, 7 Drawing Sheets

(51) Int. Cl.
  *B65H 37/00* (2006.01)
  *B29C 39/00* (2006.01)
  *C01B 33/158* (2006.01)
  *B29B 15/12* (2006.01)
  *F16L 59/06* (2006.01)
  *F16L 59/02* (2006.01)
  *C01B 33/159* (2006.01)

(52) U.S. Cl.
  CPC ........... *B65H 37/00* (2013.01); *C01B 33/141* (2013.01); *C01B 33/158* (2013.01); *C01B 33/159* (2013.01); *C01B 33/1585* (2013.01); *F16L 59/026* (2013.01); *F16L 59/06* (2013.01)

(56) References Cited

U.S. PATENT DOCUMENTS

| | | | |
|---|---|---|---|
| 6,319,852 | B1 | 11/2001 | Smith et al. |
| 6,989,123 | B2 | 1/2006 | Lee et al. |
| 7,399,439 | B2 | 7/2008 | Lee et al. |
| 7,780,890 | B2 | 8/2010 | Lee et al. |
| 10,112,796 | B2 * | 10/2018 | Kim ................. B29C 41/28 |
| 2005/0046086 | A1 * | 3/2005 | Lee ................... B29C 39/18 264/444 |
| 2005/0167891 | A1 | 8/2005 | Lee et al. |
| 2007/0148435 | A1 | 6/2007 | Meredith et al. |
| 2008/0093016 | A1 | 4/2008 | Lee et al. |
| 2009/0029109 | A1 | 1/2009 | Seth et al. |
| 2013/0052117 | A1 | 2/2013 | Imai et al. |
| 2016/0258153 | A1 | 9/2016 | Koebel et al. |

FOREIGN PATENT DOCUMENTS

| | | | |
|---|---|---|---|
| EP | 0581510 | A1 | 2/1994 |
| EP | 2813338 | A1 | 12/2014 |
| JP | 54-133659 | A | 10/1979 |
| JP | 06-32935 | A | 2/1994 |
| JP | H07-316337 | A | 12/1995 |
| JP | 10-70121 | A | 3/1998 |
| JP | 2007-524528 | A | 8/2007 |
| JP | 2011-178925 | A | 9/2011 |
| JP | 2015-003860 | A | 1/2015 |
| KR | 101147495 | * | 5/2011 |
| KR | 10-2011-0126381 | A | 11/2011 |
| KR | 10-1105436 | B1 | 1/2012 |
| KR | 10-2012-0012836 | A | 2/2012 |
| WO | 2010-143902 | A2 | 12/2010 |
| WO | 2015/014813 | A1 | 2/2015 |

OTHER PUBLICATIONS

Tillotson T M et al., "Transparent Ultralow-Density Silica Aerogels Prepared by a Two-Step Sol-Gel Process," Journal of Non-Crystalline Solids, North-Holland Physics Publishing, vol. 145, No. 1/03, Aug. 1, 1992, pp. 44-50.

XP002778527, Database WPI, Week 201163, Thomson Scientific, London, GB; AN 2011-L84478 pp. 1-3. (Corresponding JP 2011-178925, published Sep. 15, 2011).

* cited by examiner

| | AEROGEL DENSITY (kg/m³) | CATALYST INJECTION RATE (L/min) | CONTENT OF AEROGEL IN BLANKET (wt%) | THERMAL CONDUCTIVITY (mW/m K) |
|---|---|---|---|---|
| EMBODIMENT 1 | 40 | 0.035 | 30 | 14.9 |
| EMBODIMENT 2 | 60 | 0.017 | 38 | 14.1 |
| EMBODIMENT 3 | 80 | 0.014 | 45 | 13.6 |
| EMBODIMENT 4 | 100 | 0.012 | 55 | 13.0 |
| COMPARATIVE EXAMPLE 1 | 40 | 0.035 | 27 | 18.0 |

METHOD AND APPARATUS FOR MANUFACTURING AEROGEL SHEET

CROSS-REFERENCE TO RELATED APPLICATION

This application is a Divisional of U.S. patent application Ser. No. 15/565,017, filed Oct. 6, 2019, now allowed, which is the U.S. National Phase of International Application No. PCT/KR2017/000576, filed Jan. 17, 2017, which claims the benefit of Korean Application No. 10-2016-0006337, filed on Jan. 19, 2016, all of which are hereby incorporated by reference in their entirety for all purposes as if fully set forth herein.

TECHNICAL FIELD

The present invention relates to a method and apparatus for manufacturing an aerogel sheet, and more particularly, to a method and apparatus for manufacturing an aerogel sheet having excellent heat insulation and durability and having a uniform thickness.

BACKGROUND ART

In general, aerogel is a high porosity material having high porosity of about 90% to about 99% in solids that are known up to date. A silica precursor solution is subjected to sol-gel polymerization reaction to from gel, and then, drying process is performed on the formed gel under supercritical or atmospheric conditions to obtain the aerogel. That is, aerogel has a pore structure filled with air.

The above-described aerogel is lightweight and has physical properties such as heat insulation and sound absorption due to the unique pore structure in which 90% to 99% of an internal space is empty. The greatest advantage of the above-described advantages is the high heat insulation having thermal conductivity of 30 mW/m·k or less, which is significantly lower than thermal conductivity of 36 mW/m·k that is thermal conductivity of an organic insulation material such as conventional Styrofoam and the like.

However, the aerogel according to the related art have problems that the sheet has nonuniform thickness and poor heat insulation and durability.

DISCLOSURE OF THE INVENTION

Technical Problem

The present invention has been made to solve the above-mentioned problems, and an object of the prevent invention is to provide a method and apparatus for manufacturing an aerogel sheet having excellent heat insulation and durability and having a uniform thickness.

Technical Solution

To achieve the above-described object, a method for manufacturing an aerogel sheet according to a first embodiment of the present invention includes: a step (a) of preparing silica sol; a step (b) of preparing a gelling catalyst; a step (c) of injecting the silica sol, which is prepared in the step (a), to a surface of a blanket to impregnate the silica sol; and a step (d) of injecting the gelling catalyst, which is prepared in the step (b), to the surface of the blanket, into which the silica sol is impregnated, to gelate the silica sol.

In the step (a), tetraethyl orthosilicate (TEOS) and ethanol may be mixed to prepare the silica sol.

The tetraethyl orthosilicate (TEOS) may include hydrolyzed TEOS.

In the step (b), ethanol and ammonia water ($NH_4OH$) may be mixed to prepare the gelling catalyst.

The step (c) and the step (d) may be performed within a conveyor belt that transfers the blanket from one side to the other side thereof.

The conveyor belt may include a scraper including a first scraper adjusting a thickness of the silica sol injected to the surface of the blanket and a second scraper adjusting a thickness of the gelling catalyst injected to the surface of the blanket.

In the step (d), the gelling catalyst may be injected to the surface of the blanket Oat a rate of 0.035 L/min to 0.012 L/min to leave the gelling catalyst for a time of 8 minutes to 12 minutes and thereby to gelate the silica sol.

After the step (d), the method may further include a step (e) of aging the blanket in which the silica sol is gelated.

In the step (e), the blanket in which the silica sol is gelated may be aged at a temperature of 70° C. and aged for 50 minutes.

In the sheet aging step (e), the blanket in which the silica sol is gelated may be left at room temperature for 10 minutes to perform the aging.

After the step (e), the method may further include a step (f) of injecting a coating solution to the aged blanket to modify a surface of the blanket.

In the step (f), the coating solution may be prepared by mixing ethanol with ammonia water ($NH_4OH$).

In the step (f), the coating solution may be injected with 1.6 times of the silica sol impregnated into the surface of the blanket, and the aging may be performed at a high temperature of 70° C. for one hour in a reaction vessel to modify the surface of the blanket by using hexamethyldisilazane (HMDS).

After the step (f), the method may further include a step (g) of drying the blanket of which the surface is modified.

The step (g) may include a first drying step of injecting carbon dioxide at a rate of 70 L/min for ten minutes under environments of a temperature of 28° C. and a pressure of 70 bar to dry the blanket of which the surface is modified, a second drying step of raising to a temperature of 50° C. for 1 hour and 20 minutes to dry the blanket, a third drying step of injecting carbon dioxide at a rate of 0.7 L/min for 20 minutes under a temperature of 50° C. and a pressure of 150 bar to dry the blanket again, and a fourth drying step of injecting carbon dioxide at a rate of 0.7 L/min for 20 minutes after breaking for 20 minutes to dry the blanket.

In the third drying step of the step (g), the ethanol generated from the blanket of which the surface is modified may be collected while injecting the carbon dioxide.

The step (g) may further include a step of discharging the carbon dioxide for 2 hours after the fourth drying step.

The steps (e), (f), and (g) may be performed in a reaction vessel accommodating the blanket.

In the step (g), the blanket may undergo supercritical drying in the state of being accommodated in the reaction vessel.

A manufacturing apparatus for performing the method for manufacturing the aerogel sheet according to the first embodiment of the present invention includes: a supply roller around which a blanket is wound in the form of roll; a conveyor belt transferring the blanket wound around the supply roller from one side to the other side thereof; a silica sol supply member injecting the silica sol to a surface of the blanket disposed on the conveyor belt to impregnate the silica sol; a catalyst supply member injecting a gelling catalyst to the surface of the blanket disposed on the conveyor belt to gelate the silica sol; a collection roller winding the blanket, which is transferred up to the other side by the conveyor belt, in the form of a roll to collect the blanket; and a reaction vessel which accommodates the roll-shaped blanket collected by the collection roller and in which the accommodated blanket is aged, modified by injecting a coating solution, or dried at a high temperature.

Advantageous Effects

The present invention has effects as follows.

First: the present invention may use the method for manufacturing the aerogel sheet to manufacture the aerogel sheet having the superior insulation and durability, particularly, having the uniform thickness.

Second: in the method for manufacturing the aerogel sheet according to the present invention, the tetraethyl orthosilicate (TEOS) and the ethanol may be mixed to obtain the silica sol having the high quality.

Third: in the method for manufacturing the aerogel sheet according to the present invention, the hydrolyzed TEOS may be used to obtain the silica sol having the high quality.

Fourth: in the method for manufacturing the aerogel sheet according to the present invention, the ethanol and the ammonia water ($NH_4OH$) may be mixed to obtain the gelling catalyst having the high quality.

Fifth: in the method for manufacturing the aerogel sheet according to the present invention, the conveyor belt for transferring the blanket from one side to the other side thereof may be used to achieve the continuity of the operation and the simplification of the process.

Sixth: in the method for manufacturing the aerogel sheet according to the present invention, the scraper may be provided on the conveyor belt to uniformly adjust the thickness of the silica sol or the gelling catalyst.

Seventh: in the method for manufacturing the aerogel sheet according to the present invention, the blanket in which the silica sol is gelated may be aged and then dried after the surface modification to obtain the aerogel sheet having the high quality.

MODE FOR CARRYING OUT THE INVENTION

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

Figure 1:
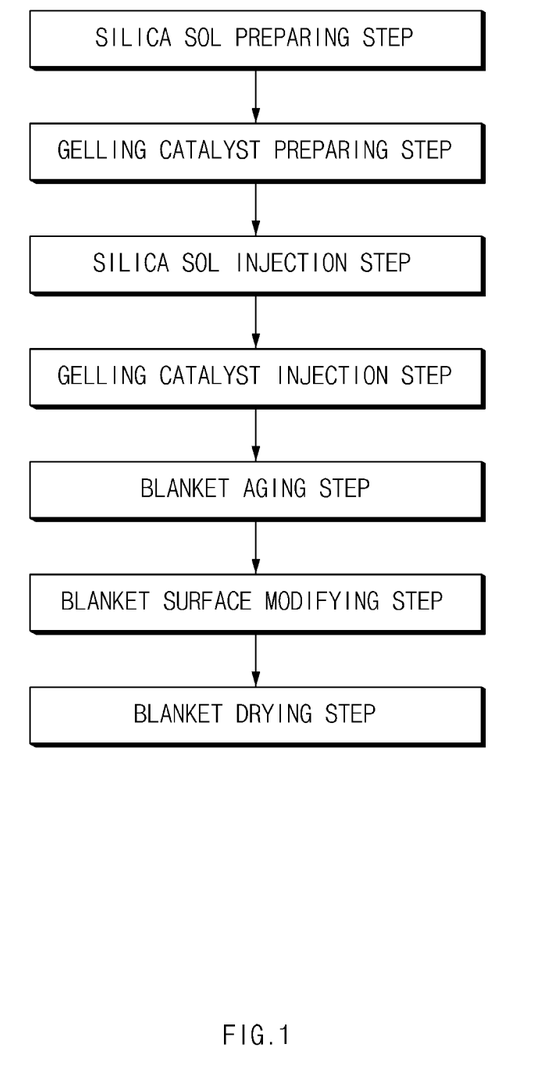
FIG. 1 is a flowchart illustrating a method for manufacturing an aerogel sheet according to the present invention.

A method for manufacturing an aerogel sheet according to the present invention includes, as illustrated in FIG. 1, a silica sol preparing step (a) of preparing silica sol, a gelling catalyst preparing step (b) of preparing a gelling catalyst, a silica sol injection step (c) of injecting the silica sol to a surface of a blanket to impregnate the silica sol, a catalyst injection step (d) of injecting the gelling catalyst to the surface of the blanket, into which the silica sol is impregnated, to gelate the silica sol, a blanket aging step (e) of aging the blanket in which the silica sol is gelated, a blanket surface modification step (f) of injecting a coating solution to the aged blanket to modify the surface of the blanket, and a blanket drying step (g) of drying the blanket of which the surface is modified.

Hereinafter, the method for manufacturing the aerogel sheet according to the present invention will be described in more detail.

(a) Silica Sol Preparing Step

The silica sol preparing step (a) is a step of obtaining the silica sol. Here, tetraethyl orthosilicate (TEOS) and ethanol are mixed to prepare the silica sol. For example, 1.2 kg of TEOS and 2.7 kg of ethanol are provided in a reaction bath (not shown) to prepare the silica sol.

The TEOS may use a solvent having high reactivity with water and be hydrolyzed to improve reactivity. That is, the hydrolyzed TEOS and the ethanol may be mixed to obtain the silica sol having excellent reactivity.

(b) Gelling Catalyst Preparing Step

The gelling catalyst preparing step (b) is a step of obtaining the gelling catalyst. Here, ethanol and ammonia water ($NH_4OH$) are mixed to prepare the gelling catalyst. For example, 0.5 kg of ethanol and 30 ml of ammonia water ($NH_4OH$) are mixed in the reaction bath (not shown) to prepare the gelling catalyst.

Figure 2:
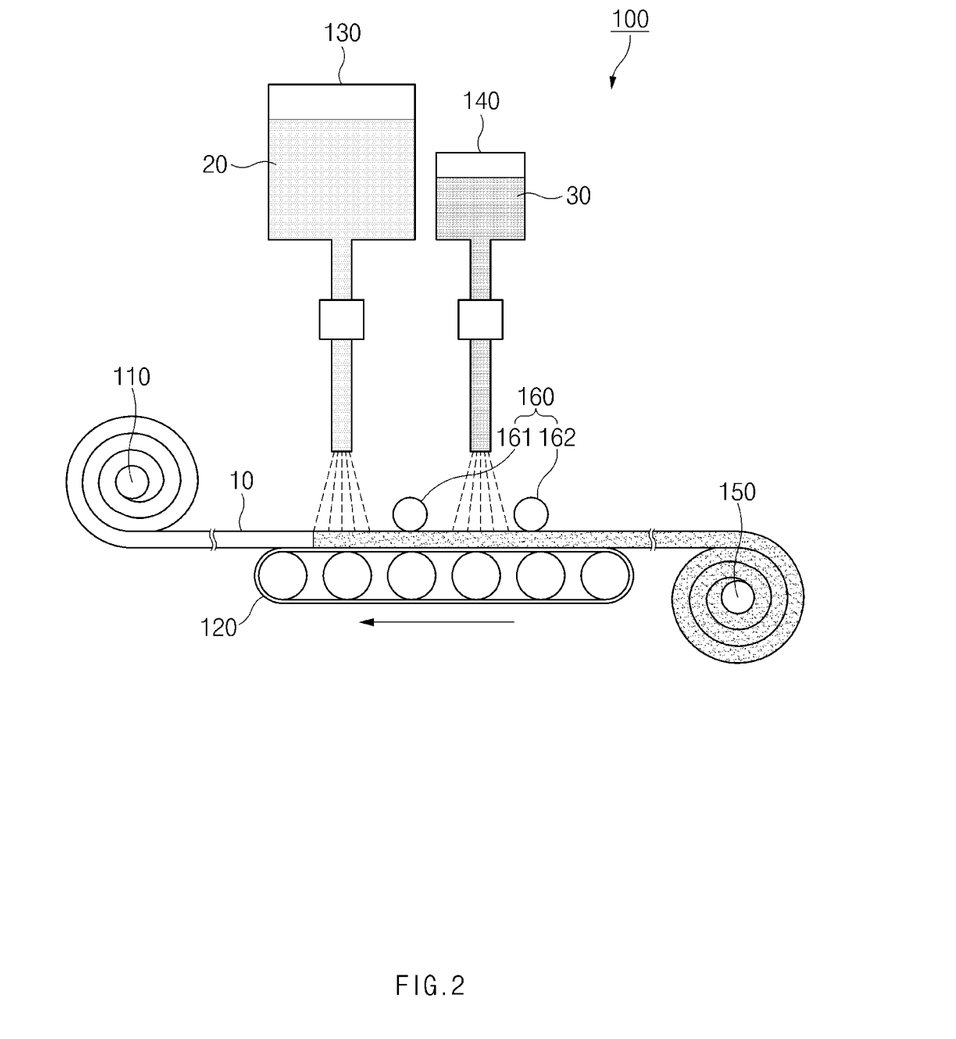
FIG. 2 is a view illustrating an apparatus for manufacturing the aerogel sheet according to the present invention.

FIG. 2 is a view illustrating an apparatus 100 for manufacturing the aerogel sheet, in which the silica sol injection step (c) and the gelling catalyst injection step (d) are performed according to the present invention.

As illustrated in FIG. 2, the apparatus 100 of manufacturing the aerogel sheet includes a supply roller 110 around which a blanket 10 is wound in the form of roll, a conveyor belt 120 for transferring the blanket 10 wound around the supply roller 110 from one side to the other side thereof, a silica sol supply member 130 for injecting the silica sol 20, which is prepared in the step (a), to a surface of the blanket 10 disposed on the conveyor belt 120 to impregnate the silica sol 20, a catalyst supply member 140 for injecting a gelling catalyst 30, which is prepared in the step (b), to gelate the silica sol, and a collection roller 150 winding the blanket 10, which is transferred up to the other side by the conveyor belt 120, in the form of a roll to collect the blanket 10.

In the apparatus 100 for manufacturing the aerogel sheet, when the supply roller 110 supplies the wound blanket 10, the conveyor belt 120 transfers the blanket 10 supplied by the supply roller 110 from one side to the other side thereof, and the collection roller 150 winds the blanket 10 again to collect the blanket 10. Here, the silica sol supply member 130 injects the silica sol 20 prepared in the step (a) to the surface of the blanket 10 transferred by the conveyor belt 120 to impregnate the silica sol. Also, the catalyst supply member 140 injects the gelling catalyst 30 to the surface of the blanket 10 in which the silica sol is impregnated to gelate the silica sol.

Here, a scraper 160 for uniformly adjusting a thickness of each of the silica sol 20 injected to the blanket 10 and the gelling catalyst 30 may be provided on the conveyor belt 120. That is, the scraper 160 includes a first scraper 161 uniformly adjusting a thickness of the silica sol 20 injected to the surface of the blanket 10 and a second scraper 162 uniformly adjusting a thickness of the gelling catalyst 30 injected to the surface of the blanket 10.

That is, the first scraper 161 and the second scraper 162 may have the same shape and be installed to be adjustable in height on a top surface of the conveyor belt 120 to uniformly adjust the thickness of each of the silica sol 20 and the gelling catalyst 30.

Hereinafter, a silica sol injection step (c) and the gelling catalyst injection step (d) using the apparatus 100 for manufacturing the aerogel sheet will be described in detail.

(c) Silica Sol Injection Step

In the silica sol injection step (c), the silica sol prepared in the step (a) is injected to the surface of the blanket and impregnated. That is, the silica sol 20 prepared in the step (a) is injected into and stored in the silica sol supply member 130. Then, when the blanket 10 is transferred up to a lower side of the silica supply member 130 by the conveyor belt 120, the silica sol 20 is injected through the silica sol supply member 130 and impregnated into the surface of the blanket 10.

Here, the silica sol 20 injected to the blanket 10 may have a uniform thickness while passing through the first scraper 161 installed on the conveyor belt 120. That is, the first scraper 161 may uniformly adjust the thickness of the silica sol 20 by blocking the silica sol 20 having a predetermined thickness or more so that the silica sol 20 does not pass.

(d) Gelling Catalyst Injection Step

In the gelling catalyst injection step (c), the gelling catalyst 30 is injected to the surface of the blanket 10 in which the silica sol is impregnated in the step (c) to gelate the silica sol. That is, the gelling catalyst 30 prepared in the step (b) is injected into and stored in the catalyst supply member 140. Then, when the blanket 10 into which the silica sol is impregnated is transferred up to a lower side of the catalyst supply member 140 by the conveyor belt 120, the gelling catalyst 30 is injected to the surface of the blanket 10 through the catalyst supply member 140 to gelate the silica sol.

Here, the catalyst supply member 140 may inject the stored gelling catalyst at a preset rate and then leave the gelling catalyst 30 for a preset time to stably gelate the silica sol. That is, the catalyst supply member 140 may inject the gelling catalyst 30 to the surface of the blanket 10 at a rate of 0.035 L/min to 0.012 L/min and then leave the gelling catalyst 30 for a time of 8 minutes to 12 minutes to gradually gelate the silica sol.

Figure 6:
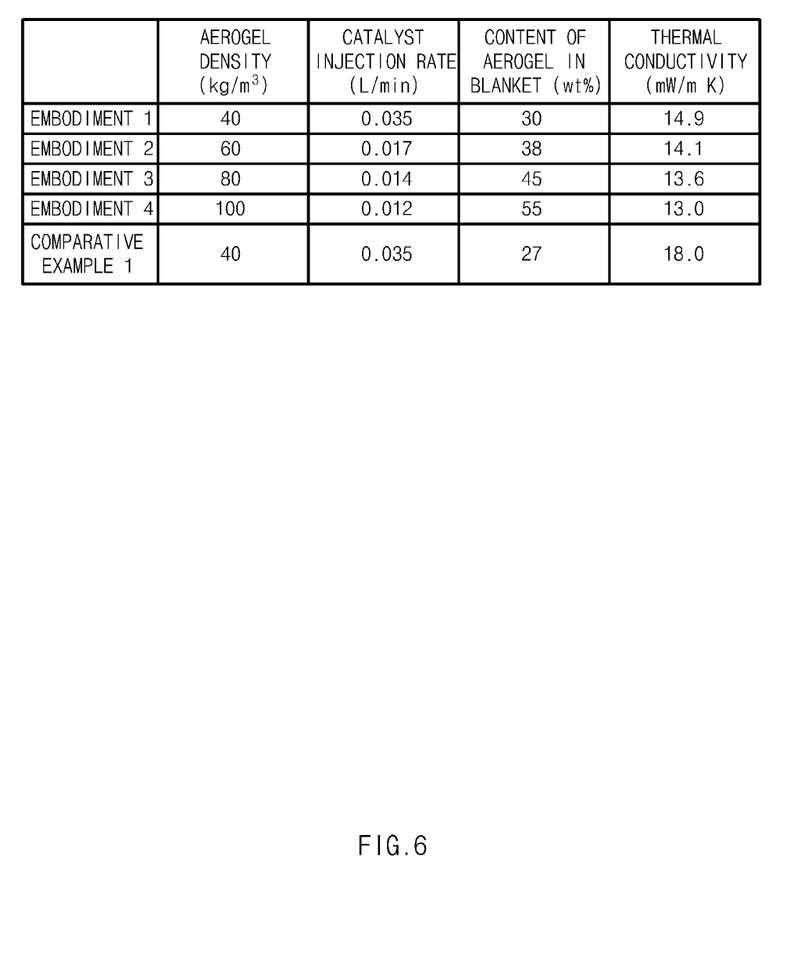
FIG. 6 is a table for comparing the aerogel sheet according to the present invention with the aerogel sheet according to the related art.

Particularly, as illustrated in FIG. 6, the catalyst supply member 140 may uniformly adjust the gelation of the silica sol by varying the injection rate of the gelling catalyst 30 according to density of the silica sol 20 impregnated in the blanket 10.

That is, referring to FIG. 6, (1) when the silica sol has a density of 40 kg/m$^3$, the injection rate of the gelling catalyst 30 is controlled to 0.035 L/min. Here, the silica sol 20 impregnated in the blanket 10 has a content of 30 wt % and thermal conductivity of 14.9 mW/mK.

(2) When the silica sol has a density of 60 kg/m$^3$, the injection rate of the gelling catalyst 30 is controlled to 0.017 L/min. Here, the silica sol 20 impregnated in the blanket 10 has a content of 38 wt % and thermal conductivity of 14.1 mW/mK.

(3) When the silica sol has a density of 80 kg/m$^3$, the injection rate of the gelling catalyst 30 is controlled to 0.014 L/min. Here, the silica sol 20 impregnated in the blanket 10 has a content of 38 wt % and thermal conductivity of 13.6 mW/mK.

(4) When the silica sol has a density of 100 kg/m$^3$, the injection rate of the gelling catalyst 30 is controlled to 0.012 L/min. Here, the silica sol 20 impregnated in the blanket 10 has a content of 55 wt % and thermal conductivity of 13.0 mW/mK.

As described above, the more the density of the silica sol increases, the more the injection rate of the gelling catalyst 30 decreases to induce stable gelation of the silica sol.

The blanket 10 in which the silica sol is gelated is collected while being wound in the roll shape by the collection roller 150, and the collected blanket 10 undergoes the aging step, the surface modification step, and the drying step to complete the aerogel sheet. Here, a reaction vessel 170 is used.

Figure 3:
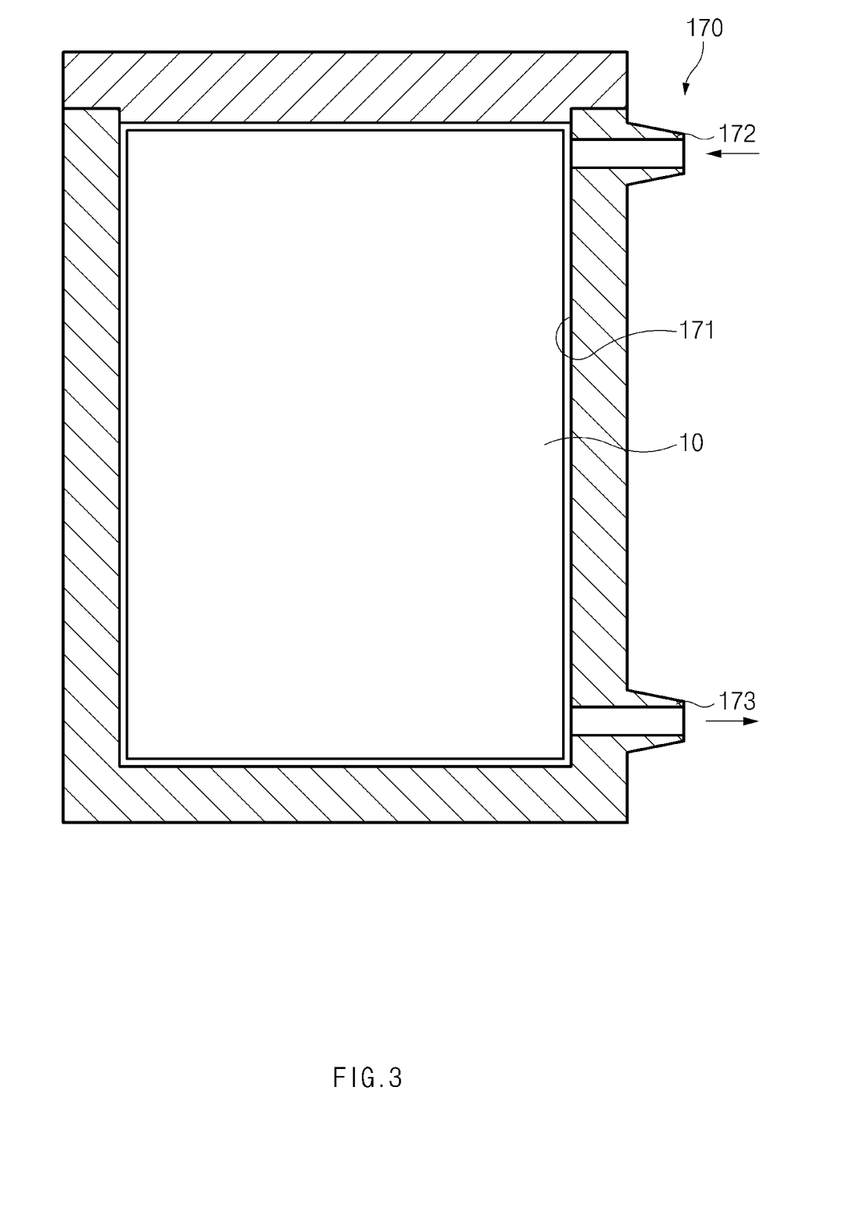
FIG. 3 is a view of a reaction vessel provided in the apparatus for manufacturing the aerogel sheet according to the present invention.

FIG. 3 is a view of a reaction vessel 170 according to the present invention.

That is, the reaction vessel 170 has an accommodation space 171 in which the blanket 10 collected in the roll shape is accommodated to be sealed, an injection hole 172 having one end connected to the accommodation space 171, and a discharge hole 173 having the other end connected to the accommodation space 171.

Hereinafter, a sheet aging step (e), a sheet surface modification step (f), and a sheet drying step (g) using the reaction vessel 170 will be described.

(e) Blanket Aging Step

In the blanket aging step (e), the sheet in which the silica sol is gelated is aged. That is, the blanket 10 in which the silica sol is gelated and which is cut in the step (d) are accommodated in the accommodation space 171 of the reaction vessel 170, and then, the accommodation space 171 of the reaction vessel 170 is heated up to a temperature of 70° C. and aged for 50 minutes to uniformize tissues of the blanket 10.

Here, in the blanket aging step (e), the blanket 10 is left at room temperature (or a temperature of 25° C.) for 10 minutes before the aging is performed in the reaction vessel 170 to perform the aging. That is, the aging for inducing the stable gelation of the silica sol may be performed to more uniformize the tissues of the blanket 10.

(f) Blanket Surface Modification Step

In the blanket surface modification step (f), a coating solution is injected to the aged blanket 10 to modify a surface of the blanket 10. That is, in the blanket surface modification step (f), ethanol and ammonia water (NH$_4$OH) are mixed to prepare a coating solution. Then, the coating solution is injected into the accommodation space 171 through the injection hole 172 of the reaction vessel 170 in which the blanket 10 is loaded to modify the surface of the blanket 10. Here, the coating solution is injected with 1.6 times of the silica sol impregnated into the surface of the blanket in the step (c), and the aging is performed at a high temperature of 70° C. for one hour in the reaction vessel 170 to modify the surface of the blanket 10 by using hexamethyldisilazane (HMDS).

The hexamethyldisilazane (HMDS) is used to modify the surface of the blanket 10 into hydrophobicity.

(g) Blanket Drying Step

In the blanket drying step (g), the blanket 10 of which the surface is modified is dried to complete an aerogel sheet. Here, in the blanket drying step (g), supercritical drying is performed in the state in which the blanket 10 is accommodated in the reaction vessel 170. That is, the sheet drying step (g) includes a first drying step of injecting carbon dioxide at a rate of 70 L/min for ten minutes under environments of a temperature of 28° C. and a pressure of 70 bar to dry the blanket 10, a second drying step of raising to a temperature of 50° C. for 1 hour and 20 minutes to dry the blanket 10, a third drying step of injecting carbon dioxide at a rate of 0.7 L/min for 20 minutes again under a temperature of 50° C. and a pressure of 150 bar to dry the blanket 10, and a fourth drying step of injecting carbon dioxide at a rate of 0.7 L/min for 20 minutes after breaking for 20 minutes to dry the blanket 10. The drying step as described above may be performed to improve a dryness factor of the blanket 10.

In the third drying step of the blanket drying step (g), ethanol is generated in the reaction vessel 170 by chemical reaction between carbon dioxide and the blanket 10, and the ethanol generated in the reaction vessel 170 is discharged through the discharge hole 173 and then is collected.

Also, the blanket drying step (g) includes a discharging step of discharging the carbon dioxide for 2 hours after the fourth drying step. Thus, a gradual environmental change is inducted in the blanket 10 to uniformize the tissues of the blanket 10.

The aerogel sheet may be manufactured through the method for manufacturing the aerogel sheet according to the present invention to uniformize the tissues and improve the heat insulation and durability.

Figure 7:
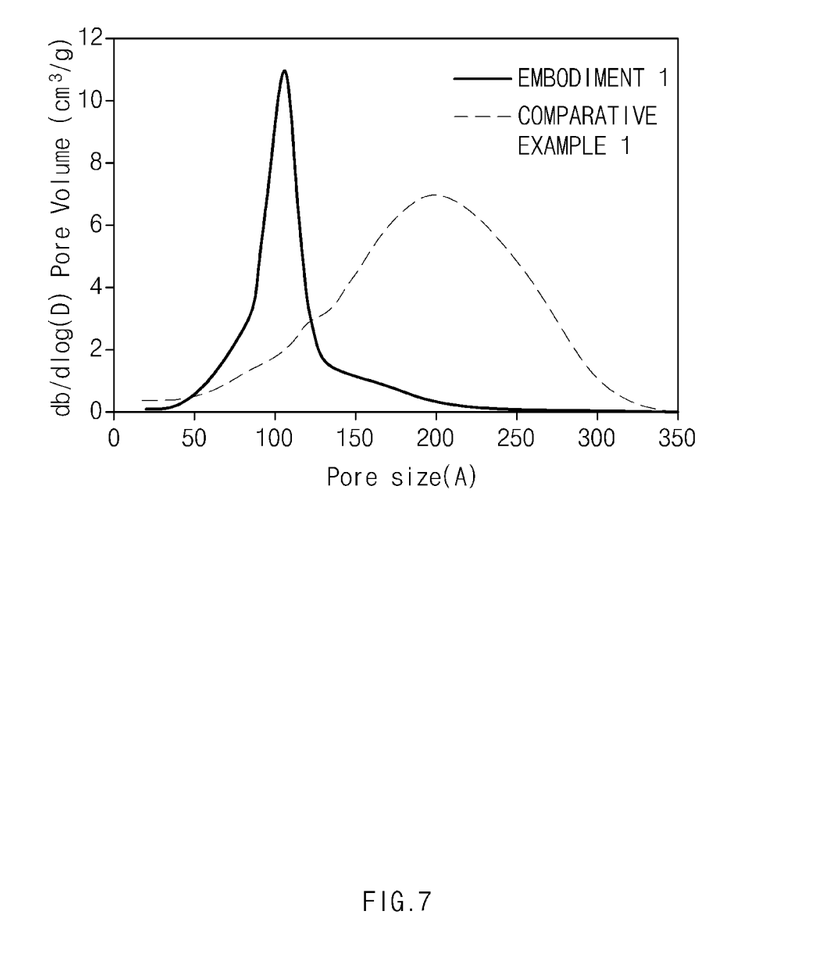
FIG. 7 is a graph for comparing the aerogel sheet according to the present invention with the aerogel sheet according to the related art.

As illustrated in FIG. 7, a difference in pore distribution of the aerogel sheet (Embodiment) manufactured according to the present invention and the aerogel sheet (Comparative Example) manufactured according to the related art is illustrated.

That is, referring to FIG. 6, when the aerogel sheet (Embodiment 1) according to the present invention has a density of 40 kg/m³, the injection rate of the gelling catalyst 30 is controlled to 0.035 L/min. Here, the silica sol 20 impregnated in the blanket 10 has a content of 30 wt % and thermal conductivity of 14.9 mW/mK.

When the aerogel sheet (Comparative Example) according to the related art has a density of 40 kg/m³, the injection rate of the gelling catalyst 30 is controlled to 0.035 L/min. Here, the silica sol impregnated in the blanket 10 has a content of 27 wt % and thermal conductivity of 18 mW/mK.

Here, the aerogel sheet (Embodiment 1) according to the present invention and the aerogel sheet (Comparative Example) according to the related art have a difference in thermal conductivity. Particularly, the aerogel sheet according to the present invention may vary in catalyst injection rate according to the density of the aerogel.

Thus, it is seen that the aerogel sheet (Embodiment) manufactured according to the present invention has uniform pore distribution of the aerogel when compared to the aerogel sheet (Comparative Example) according to the related art.

Figure 4:
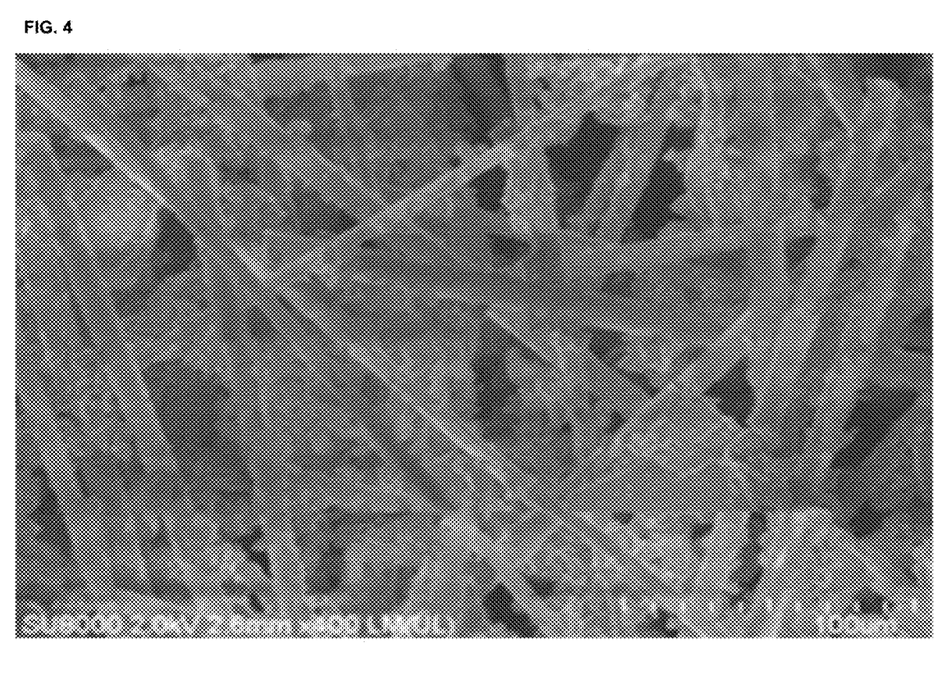
FIG. 4 is an enlarged view of a blanket in which aerogel is impregnated according to the present invention.
Figure 5:
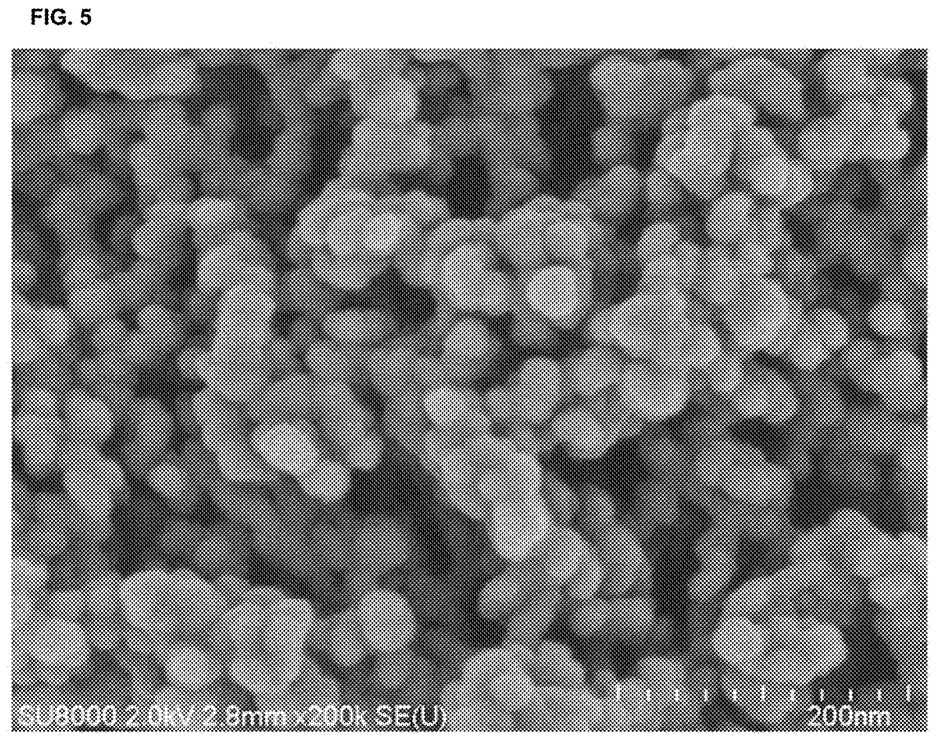
FIG. 5 is an enlarged view of the aerogel sheet according to the present invention.

Also, as illustrated in FIGS. 4 and 5, it is seen that, in the aerogel sheet (Comparative Example) according to the related art, the silica sol is uniformly impregnated in the blanket.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. An apparatus for manufacturing an aerogel sheet, the apparatus comprising:
   a supply roller around which a blanket is wound in the form of roll;
   a conveyor belt transferring the blanket wound around the supply roller from one side to the other side thereof;
   a silica sol supply member positioned downstream of the supply roller to inject a silica sol to a surface of the blanket disposed on the conveyor belt and impregnate the blanket with silica sol;
   a first scraper positioned between the silica sol supply member and the catalyst supply member;
   a catalyst supply member positioned downstream of the silica sol supply member to inject a gelling catalyst to the surface of the blanket impregnated with silica sol disposed on the conveyor belt and gelate the silica sol, wherein the catalyst supply member adjusts a catalyst injection rate according to a density of the silica sol;
   a second scraper positioned downstream of the catalyst supply member,
   a collection roller winding the blanket, which is transferred up to the other side by the conveyor belt, in the form of a roll to collect the blanket;
   a reaction vessel which accommodates the roll-shaped blanket collected by the collection roller and in which the accommodated blanket is aged, modified by injecting a coating solution, or dried at a high temperature, wherein the reaction vessel comprises an accommodation space in which the blanket is collected in the form of a roll, an injection hole having one end connected to the accommodation space, and a discharge hole having a second end connected to the accommodation space;
   wherein the first scraper and the second scraper have the same shape and are adjustable in height on a top surface of the conveyor belt to uniformly adjust the thickness of each of the silica sol and the gelling catalyst, and
   wherein the catalyst supply member injects the gelling catalyst to the surface of the blanket at a rate of 0.035 L/min to 0.012 L/min and then leaves the gelling catalyst for a time of 8 minutes to 12 minutes to gradually gelate the silica sol.

* * * * *